(12) United States Patent
Jiang et al.

(10) Patent No.: US 11,595,731 B2
(45) Date of Patent: Feb. 28, 2023

(54) IMPLEMENTATION METHOD AND SYSTEM OF REAL-TIME SUBTITLE IN LIVE BROADCAST AND DEVICE

(71) Applicant: Shanghai Bilibili Technology Co., Ltd., Shanghai (CN)

(72) Inventors: Jun Jiang, Shanghai (CN); Junwei Zhu, Shanghai (CN); Zhaozhi Xiong, Shanghai (CN); Nanling Zheng, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/168,506

(22) Filed: Feb. 5, 2021

(65) Prior Publication Data

US 2021/0250660 A1 Aug. 12, 2021

(30) Foreign Application Priority Data

Feb. 12, 2020 (CN) .......................... 202010089709.9

(51) Int. Cl.
| | |
|---|---|
| *H04N 21/488* | (2011.01) |
| *G06F 40/166* | (2020.01) |
| *G06F 40/232* | (2020.01) |
| *G10L 15/26* | (2006.01) |
| *H04N 21/242* | (2011.01) |
| *H04N 21/262* | (2011.01) |

(Continued)

(52) U.S. Cl.
CPC ....... *H04N 21/4884* (2013.01); *G06F 40/166* (2020.01); *G06F 40/232* (2020.01); *G10L 15/26* (2013.01); *H04N 21/242* (2013.01); *H04N 21/2625* (2013.01); *H04N 21/4312* (2013.01); *H04N 21/4394* (2013.01)

(58) Field of Classification Search
CPC ............. H04N 21/4884; H04N 21/242; H04N 21/2625; H04N 21/4312; H04N 21/4394; G06F 40/166; G06F 40/232; G10L 15/26
See application file for complete search history.

(56) References Cited

U.S. PATENT DOCUMENTS

| | | | |
|---|---|---|---|
| 2009/0185074 A1* | 7/2009 | Streijl | H04N 21/4355 |
| | | | 348/E7.001 |
| 2021/0014575 A1* | 1/2021 | Selfors | H04N 21/4856 |
| 2021/0074277 A1* | 3/2021 | Lewis | G06F 3/0481 |

FOREIGN PATENT DOCUMENTS

| | | | |
|---|---|---|---|
| CN | 108063970 A | | 5/2018 |
| JP | 2008199117 A | * | 8/2008 |
| JP | 2012105234 A | * | 5/2012 |

\* cited by examiner

*Primary Examiner* — Jefferey F Harold
*Assistant Examiner* — Alexander Boyd
(74) *Attorney, Agent, or Firm* — BakerHostetler

(57) ABSTRACT

The present disclosure describes techniques of synchronizing subtitles in live broadcast The disclosed techniques comprise obtaining a source signal and a simultaneous interpretation signal in a live broadcast; performing voice recognition on the simultaneous interpretation signal in real-time to obtain corresponding translation text; delaying the simultaneous interpretation signal to obtain a first delayed signal; delaying the source signal to obtain a second delayed signal; obtaining proofreading results of the first delayed signal and the corresponding translation text; determining proofread subtitles based on the proofreading results; and sending the proofread subtitles and the second delay signal to a live display interface.

17 Claims, 6 Drawing Sheets

| Time to be applied: Delay 00:00:30.859 Subtitle delay 30859 APP delay (ms) | Current Application time: Delay 00:00:30.829 CN stream Start time: 652467, EN stream Start after confirmation, please click the app button manually. | |
|---|---|---|
| Historical subtitles that have been output and displayed to users | Remaining available proofreading time | Subtitles obtained by voice recognition and dictation |
| 0 | Ah, introduce it to us | 14 | You can take this game to apple ah cat |
| 1 | Er Kou nano | 17 | That is to say, our flag worm drags a trip to this game |
| 4 | Thank you | - | Frog, it has to go through these |
| 8 | We all like the game of frog crossing the river | | |
| 10 | Well, it's a very cute game, eh | | |
| 13 | Nano is very excited | | |

(51) Int. Cl.
*H04N 21/439* (2011.01)
*H04N 21/431* (2011.01)

| | Time to be applied: Delay 00:00:30.859 Subtitle delay 30859 APP delay (ms) | Current Application time: Delay 00:00:30.829 CN stream Start time: 652467, EN stream Start after confirmation, please click the app button manually. | |
|---|---|---|---|
| | Historical subtitles that have been output and displayed to users | Remaining available proofreading time | Subtitles obtained by voice recognition and dictation |
| 0 | Ah, introduce it to us | 14 | You can take this game to apple ah cat |
| 1 | Er Kou nano | 17 | That is to say, our flag worm drags a trip to this game |
| 4 | Thank you | - | Frog, it has to go through these |
| 8 | We all like the game of frog crossing the river | | |
| 10 | Well, it's a very cute game, eh | | |
| 13 | Nano is very excited | | |

IMPLEMENTATION METHOD AND SYSTEM OF REAL-TIME SUBTITLE IN LIVE BROADCAST AND DEVICE

CROSS-REFERENCE TO RELATED APPLICATION

The present application claims priority of the Chinese patent application with number CN 202010089709.9, filed on Feb. 12, 2020, entitled "Implementation method and system of real-time subtitle in live broadcast and device." Entire content of the Chinese patent application is incorporated in the present application by reference.

BACKGROUND

Video news live broadcast generally broadcasts news online to users through streaming media servers, and the users watch the video news through clients. However, as the video news live is broadcasted simultaneously, cannot be translated in advance, and users in different countries cannot quickly understand the content of the news due to language problems, which limits the regionalism of the news live.

SUMMARY

One purpose of the present application is to provide an implementation method and system of real-time subtitle in live broadcast and device, so as to solve the problems of delay, inflexibility, and greater regional influence in real-time subtitle in live broadcast in the prior art.

According to one aspect of the present application, an implementation method of real-time subtitle in live broadcast is provided, the method including:

obtaining a source signal and a simultaneous interpretation signal in a live broadcast, delaying the simultaneous interpretation signal as a first delayed signal, and delaying the source signal as a second delayed signal;

performing voice dictation on the simultaneous interpretation signal without being delayed to obtain a translated text;

obtaining proofreading results of the first delayed signal and the translated text by a proofreader;

determining proofread subtitles according to the proofreading result, and sending the proofread subtitles and the second delay signal to a live display interface.

Further, the delaying the simultaneous interpretation signal as a first delayed signal includes:

delaying the simultaneous interpretation signal according to a time required for the voice dictation, and regarding a delayed signal as the first delayed signal.

Further, the delaying the source signal as a second delayed signal includes:

delaying the source signal according to the first delayed signal and a proofreading time required by the proofreader to determine the second delayed signal.

Further, the method further includes:

sending the first delayed signal and/or the translated text to a proofreading interface as subtitles, and displaying each of the subtitles correspondingly in an input box of the proofreading interface.

Further, after displaying each of the subtitles correspondingly in an input box of the proofreading interface, the method including:

determining an editing countdown of each of the subtitles according to the simultaneous interpretation signal without being delayed and the second delayed signal, and displaying the editing countdown on the proofreading interface.

Further, the method includes:

obtaining the proofreading result or a modification operation of the subtitle in the input box by a user within a remaining time of the editing countdown, and updating the subtitle in the input box according to the proofreading result or the modification operation.

Further, the method includes:

displaying all the subtitles in columns in the proofreading interface in a chronological order, when there is no remaining time in the editing countdown of all subtitles in a column, removing all the subtitles in the column from the proofreading interface.

According to another aspect of the present application, an implementation system of real-time subtitle in live broadcast is also provided, the system including:

a transfer server, a player, a voice recognition service module, a proofreading module and a signal compositing module, wherein the transfer server includes a first transfer and a second transfer, the first transfer is for obtaining a simultaneous interpretation signal in a live broadcast, delaying the simultaneous interpretation signal as a first delayed signal; the second transfer is for obtaining a source signal in the live broadcast, delaying the source signal as a second delayed signal;

the voice recognition service module is for receiving the simultaneous interpretation signal without being delayed sent by the first transfer, and performing voice dictation on the simultaneous interpretation signal without being delayed to obtain a translated text;

the proofreading module is for obtaining proofreading results of the first delayed signal and the translated text by a proofreader through the player;

the signal compositing module is for determining proofread subtitles according to the proofreading result, and sending the proofread subtitles and the second delay signal to a live display interface.

According to another aspect of the present application, an implementation device of real-time subtitle in live broadcast is also provided, which includes one or more processors, and a memory storing computer-readable instructions, when the computer-readable instructions are executed by the processor to implement the operation of the method as described above.

According to another aspect of the application, a computer-readable storage medium is also provided, which stores computer-readable instructions that upon, when the computer-readable instructions are executed by a processor to implement the method as described above.

Compared with the prior art, in the present application, through obtaining a source signal and a simultaneous interpretation signal in a live broadcast, delaying the simultaneous interpretation signal as a first delayed signal, and delaying the source signal as a second delayed signal; performing voice dictation on the simultaneous interpretation signal without being delayed to obtain a translated text; obtaining proofreading results of the first delayed signal and the translated text by a proofreader; determining proofread subtitles according to the proofreading result, and sending the proofread subtitles and the second delay signal to a live display interface, thereby providing a viewing experience of no delay and similar to movie subtitle for the live broadcast content in a condition of a small amount of human participation.

BRIEF DESCRIPTION OF THE DRAWINGS

By reading the detailed description of the non-limiting embodiments with reference to the following drawings, other features, purposes and advantages of the present application will become more apparent.

The same or similar reference signs in the drawings represent the same or similar parts.

DETAILED DESCRIPTION OF ILLUSTRATIVE EMBODIMENTS

The present application will be further described in detail below in conjunction with the drawings.

In a typical configuration of the present application, a terminal, a device serving a network and a trusted party all include one or more processors (for example, a central processing unit (CPU)), an input/output interface, a network interface, and a memory.

The memory may include non-permanent memory in a computer-readable storage medium, a Random Access Memory (RAM) and/or a non-volatile memory, such as a Read Only Memory (ROM) or a flash memory (flash RAM). The memory is an example of the computer-readable storage medium.

The computer-readable storage medium includes permanent and non-permanent, removable and non-removable media, and information storage can be realized by any method or technology. The information can be computer-readable instructions, data structures, program modules, or other data. Examples of computer storage medium include, but are not limited to, a Phase-Change RAM (PRAM), a Static Random Access Memory (SRAM), and a Dynamic Random Access Memory (DRAM), other types of Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disk (DVD) or other optical storage, and a magnetic cassette. A magnetic tape disk storage or other magnetic storage device or any other non-transmission medium can be used to store information which can be accessed by computing devices. According to the definition in this article, the computer-readable storage medium does not include non-transitory media, such as modulated data signals and carrier waves.

Figure 1:
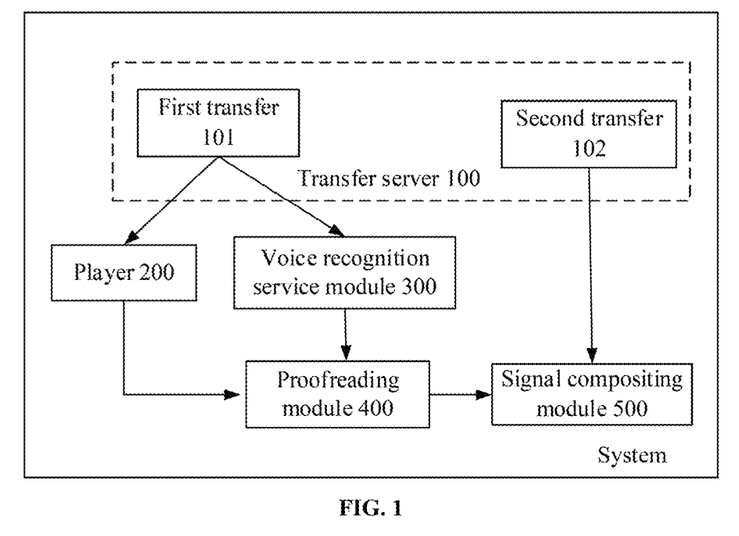
FIG. 1 shows a structural diagram of an implementation system of real-time subtitle in live broadcast according to one aspect of the present application.

FIG. 1 shows a structural diagram of an implementation system of real-time subtitle in live broadcast according to one aspect of the present application, the system includes: a transfer server 100, a player 200, a voice recognition service module 300, a proofreading module 400 and a signal compositing module 500, the transfer server 100 includes a first transfer 101 and a second transfer 102, the first transfer 101 is for obtaining a simultaneous interpretation signal in a live broadcast, delaying the simultaneous interpretation signal as a first delayed signal; the second transfer 102 is for obtaining a source signal in the live broadcast, delaying the source signal as a second delayed signal; the voice recognition service module 300 is for receiving the simultaneous interpretation signal without being delayed sent by the first transfer 101, and performing voice dictation on the simultaneous interpretation signal without being delayed to obtain a translated text; the proofreading module 400 is for obtaining proofreading results of the first delayed signal and the translated text by a proofreader through the player 200; and the signal compositing module 500 is for determining proofread subtitles according to the proofreading result, and sending the proofread subtitles and the second delay signal to a live display interface. Herein, the external streaming media server transmits the source signal and the simultaneous interpretation signal in the live broadcast to the transfer server, the transfer server is a proxy server for indirect connection between a client and a server for data transferring. The source signal includes video information in the live broadcast and voice information of a speaker, and the simultaneous interpretation signal includes the signal for translating the voice of the speaker in the live broadcast. The transfer server includes two transfers, the first transfer delays the simultaneous interpretation signal as the first delayed signal, and the second transfer delays the source signal as the second delayed signal to meet the synchronization with the proofread simultaneous interpretation signal subsequently. The first transfer transmits the first delayed signal to a streaming media player, and transmits the simultaneous interpretation signal without being delayed (which is a real-time signal) to the voice recognition service module for the voice dictation to obtain the corresponding translated text. The proofreading module proofreads the translated text obtained by voice dictation of the real-time signal. The proofreader proofreads the first delayed signal after watching and dictation. The proofreader can also proofread the translated text proofread by the proofreading software again. Comprehensive proofreading results are obtained after proofreading of the first delayed signal and proofreading the translated text by the proofreader. Then, the signal compositing module determines the proofread subtitles according to the finally proofreading results, the proofread subtitles are the ones that required to be displayed in the live broadcast. The second delayed signal obtained by delaying the source signal and the proofread subtitles are simultaneously put on the live display interface to achieve real-time synchronization. Wherein, the signal compositing module can be an Open Broadcaster Software (OBS), after being manually corrected by the proofreader through the proofreading software, the dictation results of the voice recognition dictation service is provided timely to the OBS software, and the subtitles are embedded in the live screen. It should be noted that the OBS is a free and open source cross-platform streaming media and video recording program.

Figure 2:
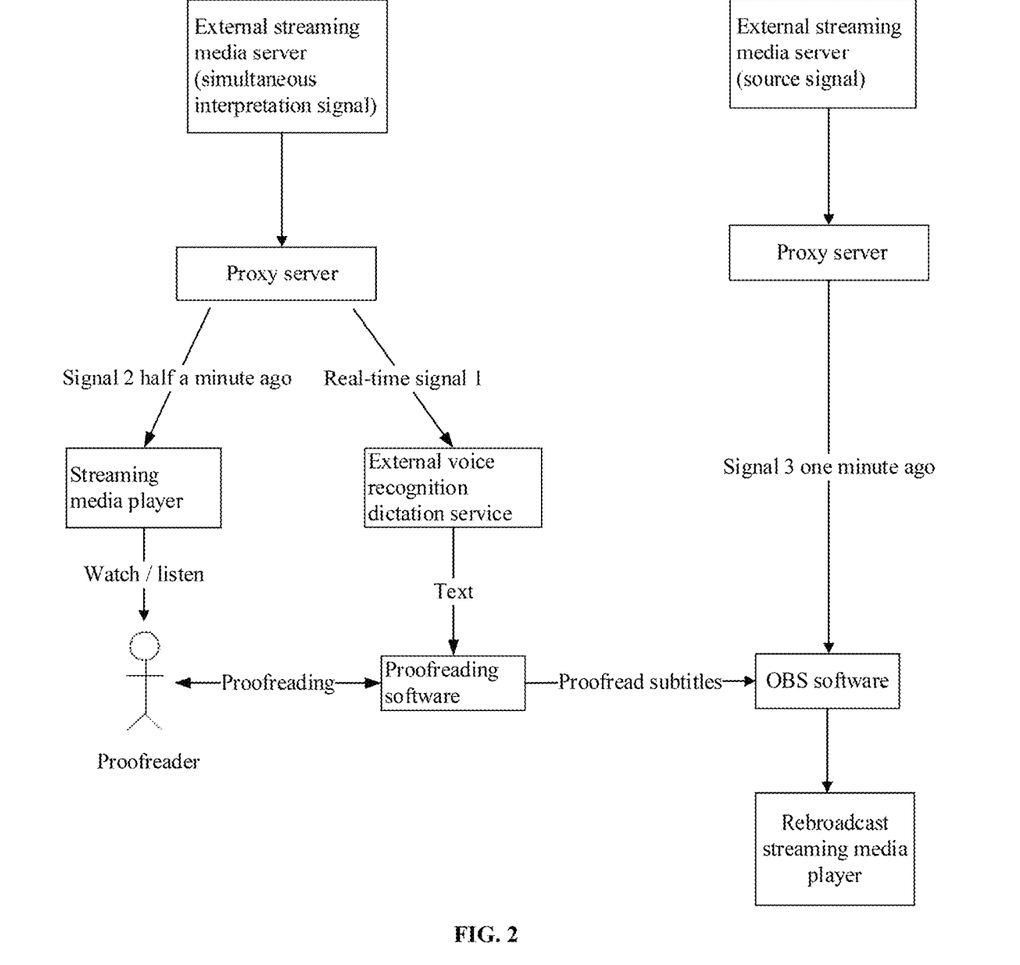
FIG. 2 shows a schematic diagram of an implementation of real-time subtitle in live broadcast according to a specific embodiment of the present application.

In a specific embodiment of the present application, as shown in FIG. 2, the external streaming media server transmits the simultaneous interpretation signal and the source signal to the proxy server. In the proxy server, the simultaneous interpretation signal is delayed for half a minute, and the signal 2 half a minute ago is obtained. The signal 2 is the delay amplitude for the proofreader to watch the picture and hear the voice, and the simultaneous interpretation signal without being delayed is regarded as the real-time signal 1. The proxy server delays the source signal for one minute, and obtains the signal 3 one minute ago. The delay amplitude of the signal 3 is greater than the delay amplitude of the proofreader seeing the picture and hearing the sound. The proxy server transmits the real-time signal 1 to an external voice recognition dictation service for translation into text, and proofreads the translated text through the proofreading software, and transmits the signal 2 half a minute ago to the streaming media player so that the proofreaders can watch and listen to complete proofreading. According to the proofreading of the translated text and the proofreading of the signal 2 half a minute ago, the proofread subtitles are determined, and the proofread subtitles and the aforementioned signal 3 one minute ago are provided to the OBS live broadcast software to embed the subtitles in the live broadcast screen. Wherein, the difference between the real-time signal and the signal 2 half a minute ago is the working time of the external voice recognition dictation service, and the difference between the signal 2 half a minute ago and the signal 3 one minute ago is the working time of the proofreader. The proofreading software in the embodiments of the present application can extract the audio part of a specified streaming media signal in real-time, perform dictation through the accessed online voice recognition service, display the subtitle text obtained by the dictation on the subtitle, allow the proofreader to perform manual proofreading and modification, and can show how much time is left for modification for each subtitle. The proofreading software obtains time of the current content played by OBS to complete the proofreading work according to the obtained time, and the time of the current content played by OBS can be provided by using an OBS patch. The OBS patch can provide an external interface when OBS plays streaming media, and obtain a timestamp of the current playing progress of the streaming media being played, and enhance the text update function of the OBS at the same time, so that the response speed can meet the demand of the subtitles. The proxy server used in the embodiments of the present application can make it possible to obtain the latest real-time live broadcast data that can be decoded by a decoder whenever it is connected, and provide a client with the live broadcast data before a specified time period at an approximate real-time speed.

Figure 3:
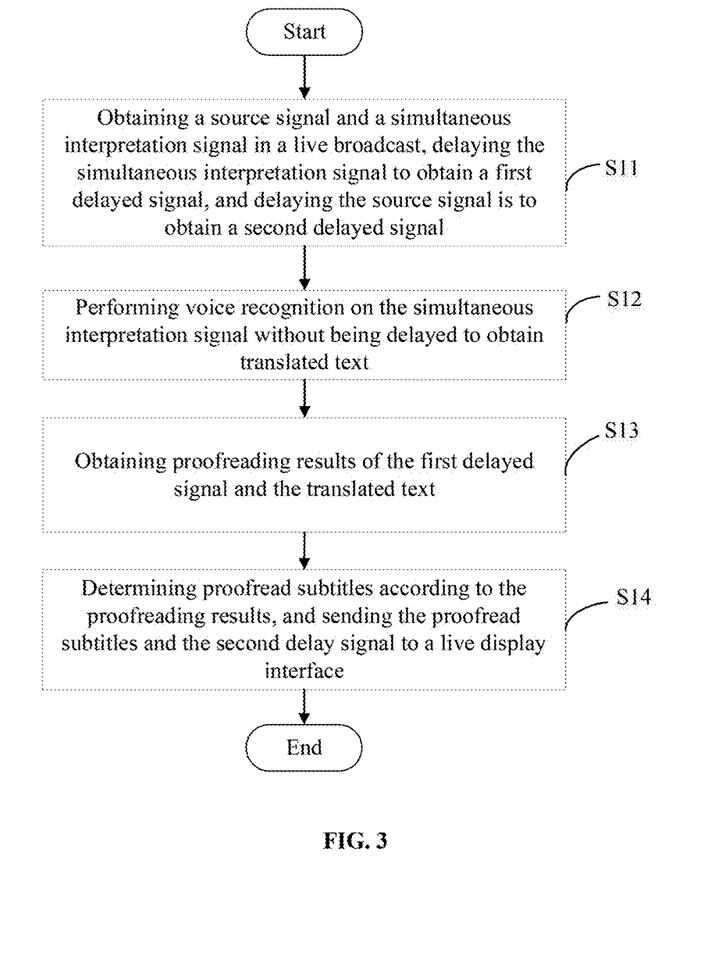
FIG. 3 shows a schematic flowchart of an implementation method of real-time subtitle in live broadcast according to another aspect of the present application.

FIG. 3 shows a schematic flowchart of an implementation method of real-time subtitle in live broadcast according to another aspect of the present application. The method includes: step S1 to step S14, In the step S11, a source signal and a simultaneous interpretation signal are obtained in a live broadcast, the simultaneous interpretation signal is delayed as a first delayed signal, and the source signal is delayed as a second delayed signal. Herein, the source signal and simultaneous interpretation signal in a streaming media server for live broadcast are obtained, the source signal includes the video information in the live broadcast and the voice information of a speaker, and the simultaneous interpretation signal includes the signal for translating the voice of the speaker in the live broadcast. The simultaneous interpretation signal obtained in the live broadcast is delayed as the first delayed signal to carry out the follow-up processing such as a proofreading processing on the first delayed signal, and at the same time the source signal is also delayed as the second delayed signal to satisfy the follow-up synchronization of the proofread simultaneous interpretation signal. It should be noted that the streaming media refers to a technology and process that compresses a series of multimedia data and sends the data in segments through the Internet, and then transmits audio and video on the Internet for viewing. The source signal and simultaneous interpretation signal obtained in the present application are obtained from the streaming media server, so that the data packets of the source signal and the simultaneous signal can be sent in the form of data stream, which is convenient for subsequent delay and proofreading process.

In step S12, the simultaneous interpretation signal without being delayed is performed voice dictation on to obtain a translated text; herein, the obtained simultaneous interpretation signal is processed in two ways, one way is delayed as the first delayed signal and then transmitted to the streaming media player, the other way is transmitted as a real-time signal to the voice recognition dictation server for voice dictation to obtain the corresponding translated text.

In step S13, proofreading results of the first delayed signal and the translated text are obtained by a proofreader. Herein, the translated text obtained by voice dictation of the real-time signal is proofread. The proofreader proofreads the first delayed signal after watching and dictation. The proofreader can also proofread the translated text proofread by the proofreading software again. Comprehensive proofreading results are obtained after proofreading of the first delayed signal and proofreading the translated text by the proofreader. Subsequently, in step S14, proofread subtitles are determined according to the proofreading results, and the proofread subtitles and the second delay signal are sent to a live display interface. Herein, the proofread subtitles are determined according to the finally proofreading results, the proofread subtitles are the ones that required to be displayed in the live broadcast. The second delayed signal obtained by delaying the source signal and the proofread subtitles are simultaneously put on the live display interface to achieve real-time synchronization, which is implemented through an Open Broadcaster Software (OBS) software, after being manually corrected by the proofreader through the proofreading software, the dictation results of the voice recognition dictation service is provided timely to the OBS software, and the subtitles are embedded in the live screen. It should be noted that the OBS is a free and open source cross-platform streaming media and video recording program.

The implementation method of real-time subtitle in live broadcast described in the present application can provide a viewing experience of no delay and similar to movie subtitle for the live content in a condition of a small amount of human participation, and optimize the user's perception.

In an embodiment of the present application, in step S1, the simultaneous interpretation signal is delayed according to the time required for voice dictation, and the delayed signal is served as the first delayed signal. Herein, when the simultaneous interpretation signal is delayed, the delay time is determined according to the time required for voice dictation, that is, the time difference between the real-time signal of the simultaneous interpretation signal and the first delayed signal is the working time left for the external voice recognition dictation service.

Following the above embodiment, in step S11, the source signal is delayed according to the first delayed signal and proofreading time required by the proofreader to determine the second delayed signal. Herein, when the source signal is delayed, it needs to be determined according to the first delayed signal and the proofreading time required by the proofreader, that is, the time difference between the first delayed signal and the second delayed signal is the working time of the proofreader, and the time difference can be adjusted at any time according to specific usage scenarios.

In an embodiment of the present application, the method includes: step S5, sending the first delayed signal and/or the translated text to a proofreading interface as subtitles, and displaying each of the subtitles correspondingly in an input box of the proofreading interface.

Herein, when proofreading the first delayed signal and the translated text obtained by the voice recognition dictation service, the subtitle that required to be proofread are displayed in the input box of the proofreading interface, and one subtitle is displayed in one input box. The proofreading interface can include historical subtitles that have been output and displayed to users and subtitles obtained by voice recognition and dictation, and display the results of dictation and sentence segmentation on the proofreading interface. For each of the subtitle, there is a corresponding input box to display the subtitle content, which can be modified by the user.

Further, after each subtitle is correspondingly displayed in the input box of the proofreading interface, an editing countdown of each subtitle is determined according to the simultaneous interpretation signal without being delayed and the second delayed signal, and the editing countdown is displayed on the proofreading interface. Herein, for each subtitle in the proofreading interface, there can be a countdown to indicate how much time is available for proofreading. The countdown is determined based on the simultaneous interpretation signal without being delayed (which is a real-time signal) and the second delayed signal. The sum of the time consumed by the voice dictation service and the time available for proofreading is equal to the difference between the real-time signal and the second delayed signal, the difference between the real-time signal and the second delayed signal is controlled by a configured delay amplitude, and the initial state of the countdown can be set as: the real-time signal—the second delayed signal—the time consumed by the voice dictation service.

In an embodiment of the present application, the user's proofreading results or modification operation of the subtitles in the input box can be obtained within the remaining time of the editing countdown, and the subtitles in the input box can be updated according to the proofreading results or the modification operation. Herein, for each subtitle in the proofreading interface, the subtitle in the input box can be proofread during the countdown and the user is allowed to modify the subtitle. The subtitle in the input box is updated according to the proofreader's proofreading result of the subtitle in the input box, and the subtitle is updated according to the user's modification operation. When the countdown is over, the user is not allowed to perform editing operations.

Figure 4:
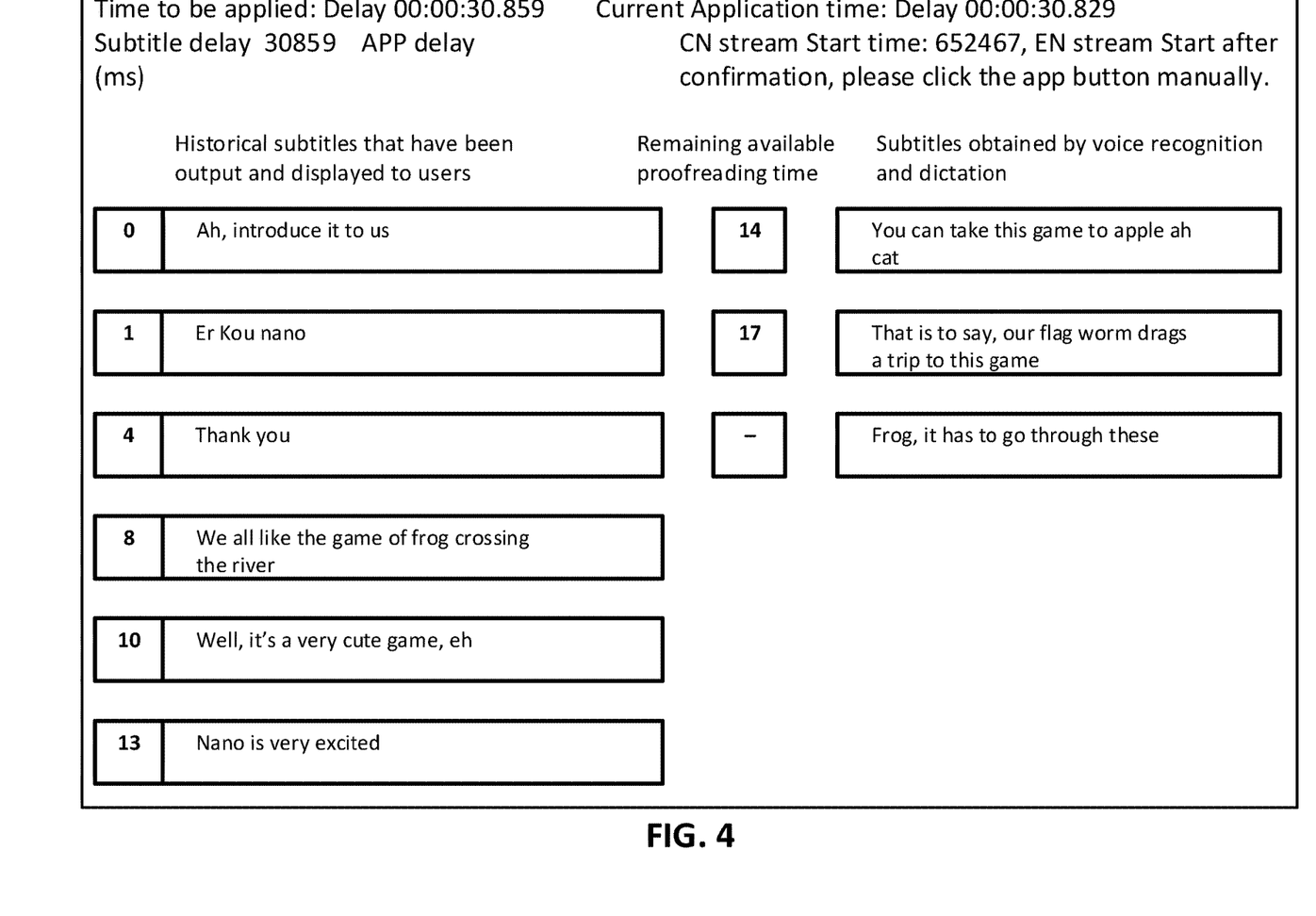
FIG. 4 shows a schematic diagram of a proofreading interface according to an embodiment of the present application.

In an embodiment of the present application, all of the subtitles can be displayed in columns in the proofreading interface in a chronological order. When there is no remaining time for the editing countdown of all subtitles in a column, the subtitles in the column are removed from the proofreading interface. Herein, as shown in FIG. 4, all subtitles are displayed in columns in the proofreading interface, and each subtitle has a corresponding remaining available proofreading time (which is editing countdown). For example, the editing countdown for the first one is zero, none user is allowed to edit; for the subtitles in each column, only when the countdown of all subtitles in the column has finished, the entire column will be removed from the proofreading interface to prevent the interface from jumping too fast to affect the work of the proofreader. In addition, in the embodiment of the present application, a computer-readable storage medium is provided, which stores computer readable instructions upon, when the computer-readable storage medium is executed by a processor to implement the aforementioned implementation method of real-time subtitle in live broadcast.

Corresponding to the method described above, the present application also provides a terminal, which includes modules or units capable of executing the method steps described in FIG. 3 or FIG. 4 or each embodiment. These modules or units can be implemented through hardware, software or a combination of software and hardware, the present application is not limited. For example, in an embodiment of the present application, an implementation device of real-time subtitle in live broadcast is also provided, the device includes:

One or more processors; and a memory storing computer-readable instructions, when the computer-readable instructions are executed by the processor to implement the operations as described in the foregoing implementation method of real-time subtitle in live broadcast.

For example, the computer-readable instructions, when executed, cause the one or more processors:

obtaining a source signal and a simultaneous interpretation signal in a live broadcast, delaying the simultaneous interpretation signal as a first delayed signal, and delaying the source signal as a second delayed signal;

performing voice dictation on the simultaneous interpretation signal without being delayed to obtain a translated text;

obtaining proofreading results of the first delayed signal and the translated text by a proofreader;

determining proofread subtitles according to the proofreading result, and sending the proofread subtitles and the second delay signal to a live display interface.

Figure 5:
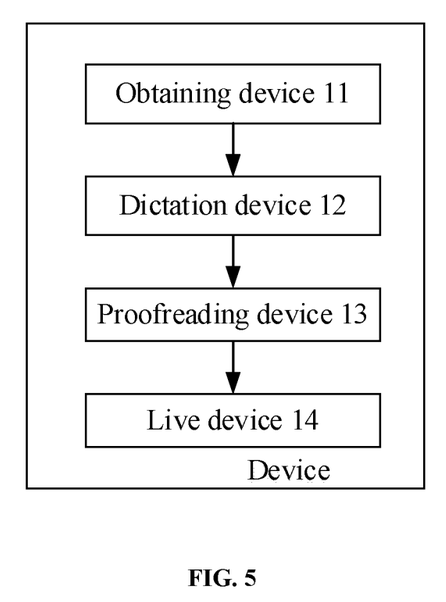
FIG. 5 shows a structural diagram of an implementation device of real-time subtitle in live broadcast according to another aspect of the present application.

FIG. 5 shows a structural diagram of an implementation device of real-time subtitle in live broadcast according to another aspect of the present application, the device includes: an obtaining device 11, a dictation device 12, a proofreading device 13 and a live device 14, wherein the obtaining device 11 is for obtaining a source signal and a simultaneous interpretation signal in a live broadcast, delaying the simultaneous interpretation signal as a first delayed signal, and delaying the source signal as a second delayed signal; the dictation device 12 is for performing voice dictation on the simultaneous interpretation signal without being delayed to obtain a translated text; the proofreading device 13 is for obtaining proofreading results of the first delayed signal and the translated text by a proofreader, the live device 14 is for determining proofread subtitles according to the proofreading results, and sending the proofread subtitles and the second delay signal to a live display interface.

It should be noted that the content executed by the obtaining device 11, the dictation device 12, the proofreading device 13, and the live device 14 are the same as or corresponding to the content in the above steps S11, S12, S13, and S14 respectively. For the sake of brevity, it will not be repeated here.

Figure 6:
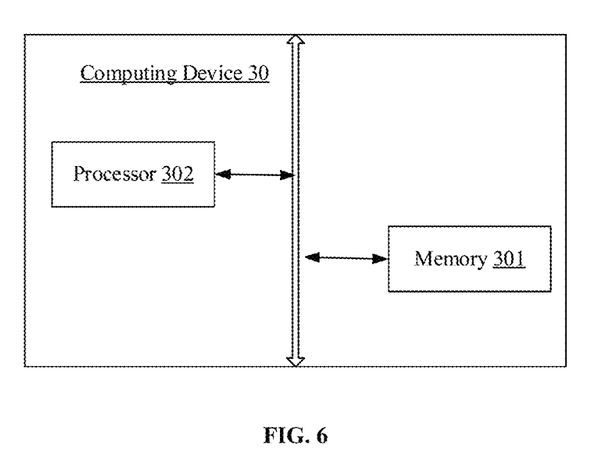
FIG. 6 is an optional schematic diagram of a hardware structure of the computing device of an embodiment of the present disclosure.

FIG. 6 illustrates an example computing device that may be used to implement techniques described in the present disclosure. As shown in FIG. 6, the computing device 30 includes, but is not limited to, a memory 301 and a processor 302 that can communicate with each other through a system bus. The memory 301 may store instructions that upon execution by the processor 302 cause the computing devise to perform the techniques described in the present disclosure Although FIG. 6 only shows the computing device 30 with components 301-302, it should be understood that more or fewer components may be included in the computing device 30.

In the embodiment, the memory 301 (that is a readable storage medium) includes a flash memory, a hard disk, a multimedia card, a card type memory (e.g., SD or DX memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. In some embodiments, the memory 301 may be an internal storage module of the computing device 30 such as the hard disk or the memory of the computing device 30. In other embodiments, the memory 301 may also be an external storage device of the computing device 30, such as a plugged hard disk, a smart media card (SMC), secure digital (SD) card, a flash memory card, and the like provided on the computing device 30. Of course, the memory 301 may also include both an internal storage module and an external storage device of the computing device 30. In the embodiment, the memory 301 is generally used to store an operating system and various types of application software installed in the computing device 30, for example, program codes of the system of displaying a video of the above embodiment. In addition, the memory 301 may also be used to temporarily store various types of data that have been or will be outputted.

The processor 302, in some embodiments, may be a central processing unit (CPU), a controller, a microcontroller, a microprocessor, or other data processing chip. The processor 302 is generally used to control the overall operation of the computing device 30.

Obviously, those skilled in the art can make various changes and modifications to the present application without departing from the spirit and scope of the present application. In this way, if these modifications and variations of the present application fall within the scope of the claims of the present application and their equivalent technologies, then the present application is also intended to include these modifications and variations.

It should be noted that the present application can be implemented in software and/or a combination of software and hardware. For example, it can be implemented using an Application Specific Integrated Circuit (ASIC), a general purpose computer or any other similar hardware device. In an embodiment, the software program of the present application may be executed by a processor to realize the steps or functions described above. Similarly, the software program (including related data structure) of the present application can be stored in computer-readable recording medium, such as RAM memory, magnetic or optical drive or floppy disk and similar devices. In addition, some steps or functions of the present application may be implemented by hardware, for example, as a circuit that cooperates with a processor to execute each step or function.

In addition, a part of the present application can be applied as a computer program product, such as computer program instructions, when the computer program instructions are executed by a computer, through the operation of the computer, the method and/or technical solution according to the present application can be invoked or provided. The program instructions that invoke the method of the present application may be stored in a fixed or removable recording medium, and/or be transmitted through a data stream in a broadcast or other signal-carrying medium, and/or be stored in the working memory of the computer device which is run according to the program instructions. Herein, an embodiment according to the present application includes a device, which includes a memory for storing computer program instructions and a processor for executing the program instructions, wherein, when the computer program instructions are executed by the processor, the device is trigged to perform the aforementioned methods and/or technical solutions according to a plurality of embodiments of the present application.

For those skilled in the art, it is obvious that the present application is not limited to the details of the foregoing exemplary embodiments, and the present application can be implemented in other specific forms without departing from the spirit or basic characteristics of the present application. Therefore, from any point of view, the embodiments should be regarded as exemplary and non-limiting. The scope of the present application is defined by the appended claims rather than the above description, and therefore it is intended to include all changes falling within the meaning and scope of equivalent elements of the claims in the present application. Any reference signs in the claims should not be regarded as limiting the claims involved. In addition, it is obvious that the word "including" does not exclude other units or steps, and the singular does not exclude the plural. A plurality of units or devices stated in the device claims can also be implemented by one unit or device through software or hardware. The first and second words are used to denote names, but do not denote any specific order.

What is claimed is:

1. A method, comprising:
    obtaining a source signal and a simultaneous interpretation signal in a live broadcast, wherein the source signal comprises video information and voice information, and the simultaneous interpretation signal comprises audio information for translating the voice information in the source signal;
    performing voice recognition on the simultaneous interpretation signal in real-time to obtain corresponding translation text;
    delaying the simultaneous interpretation signal to obtain a first delayed signal;
    delaying the source signal to obtain a second delayed signal;
    sending at least one of the first delayed signal or the corresponding translation text as subtitles to a proofreading interface;
    displaying the subtitles in columns in the proofreading interface in a chronological order;
    in response to determining that there is no remaining time of an editing countdown corresponding to each subtitle displayed in a column, removing each subtitle in the column from the proofreading interface;
    obtaining proofreading results of the first delayed signal and the corresponding translation text;
    determining proofread subtitles based on the proofreading results; and
    sending the proofread subtitles and the second delayed signal to a live display interface.

2. The method of claim 1, wherein the delaying the simultaneous interpretation signal further comprises:
    delaying the simultaneous interpretation signal according to a time required for the voice recognition.

3. The method of claim 1, wherein the delaying the source signal further comprises:

delaying the source signal according to a delayed time corresponding to the first delayed signal and a time required for proofreading the first delayed signal and the corresponding translation text.

4. The method of claim 1, further comprising:
displaying each of the subtitles correspondingly in an input box of the proofreading interface.

5. The method of claim 4, wherein after the displaying each of the subtitles correspondingly in an input box of the proofreading interface, the method further comprises:
determining an editing countdown corresponding to each of the subtitles based on a delayed time corresponding to the second delayed signal; and
displaying the editing countdown on the proofreading interface.

6. The method of claim 5, further comprising:
receiving user input of proofreading or modifying a subtitle in the input box within a remaining time of a corresponding editing countdown; and
updating the subtitle in the input box based on the user input.

7. A system, comprising:
at least one processor; and
at least one memory communicatively coupled to the at least one processor and storing instructions that upon execution by the at least one processor cause the system to perform operations, the operations comprising:
obtaining a source signal and a simultaneous interpretation signal in a live broadcast, wherein the source signal comprises video information and voice information, and the simultaneous interpretation signal comprises audio information for translating the voice information in the source signal;
performing voice recognition on the simultaneous interpretation signal in real-time to obtain corresponding translation text;
generating a first delayed signal by delaying the simultaneous interpretation signal;
generating a second delayed signal by delaying the source signal;
sending at least one of the first delayed signal or the corresponding translation text as subtitles to a proofreading interface;
displaying the subtitles in columns in the proofreading interface in a chronological order;
in response to determining that there is no remaining time of an editing countdown corresponding to each subtitle displayed in a column, removing each subtitle in the column from the proofreading interface;
obtaining proofreading results of the first delayed signal and the corresponding translation text;
determining proofread subtitles based on the proofreading results; and
sending the proofread subtitles and the second delayed signal to a live display interface.

8. The system of claim 7, wherein the delaying the simultaneous interpretation signal further comprises:
delaying the simultaneous interpretation signal according to a time required for the voice recognition.

9. The system of claim 7, wherein the delaying the source signal further comprises:
delaying the source signal according to a delayed time corresponding to the first delayed signal and a time required for proofreading the first delayed signal and the corresponding translation text.

10. The system of claim 7, the operations further comprising:
displaying each of the subtitles correspondingly in an input box of the proofreading interface.

11. The system of claim 10, wherein after the displaying each of the subtitles correspondingly in an input box of the proofreading interface, the operations further comprise:
determining an editing countdown corresponding to each of the subtitles based on a delayed time corresponding to the second delayed signal; and
displaying the editing countdown on the proofreading interface.

12. The system of claim 11, the operations further comprising:
receiving user input of proofreading or modifying a subtitle in the input box within a remaining time of a corresponding editing countdown; and
updating the subtitle in the input box based on the user input.

13. A non-transitory computer-readable storage medium, storing computer-readable instructions that upon execution by a processor cause the processor to implement operations comprising:
obtaining a source signal and a simultaneous interpretation signal in a live broadcast, wherein the source signal comprises video information and voice information, and the simultaneous interpretation signal comprises audio information for translating the voice information in the source signal;
performing voice recognition on the simultaneous interpretation signal in real-time to obtain corresponding translation text;
generating a first delayed signal by delaying the simultaneous interpretation signal;
generating a second delayed signal by delaying the source signal;
sending at least one of the first delayed signal or the corresponding translation text as subtitles to a proofreading interface;
displaying the subtitles in columns in the proofreading interface in a chronological order;
in response to determining that there is no remaining time of an editing countdown corresponding to each subtitle displayed in a column, removing each subtitle in the column from the proofreading interface;
obtaining proofreading results of the first delayed signal and the corresponding translation text;
determining proofread subtitles based on the proofreading results; and
sending the proofread subtitles and the second delayed signal to a live display interface.

14. The non-transitory computer-readable storage medium of claim 13, wherein the delaying the simultaneous interpretation signal further comprises:
delaying the simultaneous interpretation signal according to a time required for the voice recognition.

15. The non-transitory computer-readable storage medium of claim 13, wherein the delaying the source signal further comprises:
delaying the source signal according to a delayed time corresponding to the first delayed signal and a time required for proofreading the first delayed signal and the corresponding translation text.

16. The non-transitory computer-readable storage medium of claim 15, the operations further comprising:
displaying each of the subtitles correspondingly in an input box of the proofreading interface.

17. The non-transitory computer-readable storage medium of claim 16, wherein after the displaying each of the subtitles correspondingly in an input box of the proofreading interface, the operations further comprise:
    determining an editing countdown corresponding to each of the subtitles based on a delayed time corresponding to the second delayed signal; and
    displaying the editing countdown on the proofreading interface.

\* \* \* \* \*